United States Patent [19]

Miller

[11] Patent Number: 4,848,806
[45] Date of Patent: Jul. 18, 1989

[54] REDUNDANT SEAL FOR PRESSURE VESSELS

[75] Inventor: Harry Miller, Scottsdale, Ariz.

[73] Assignee: Honeywell, Inc., Minneapolis, Minn.

[21] Appl. No.: 77,360

[22] Filed: Jul. 24, 1987

[51] Int. Cl.[4] .................. F16J 15/10; F16L 17/00; F16L 19/03; F16L 23/00
[52] U.S. Cl. .................. 285/106; 60/253; 244/131; 244/158 R; 244/172; 277/27; 277/75; 277/206 R; 277/235 R; 277/236; 285/108; 285/109; 285/363
[58] Field of Search .................. 60/251, 253, 255; 244/158 R, 172, 131; 285/106, 336, 917, 363, 108, 109; 277/27, 34, 75, 236, 206 R, 207 R, 235 R; 220/240

[56] References Cited

U.S. PATENT DOCUMENTS

| | | | |
|---|---|---|---|
| 2,895,750 | 7/1959 | Gardner et al. | 277/27 X |
| 3,033,582 | 5/1962 | Creavey | 277/207 X |
| 3,042,248 | 7/1962 | Krueger | 220/240 |
| 3,088,273 | 5/1963 | Adelman et al. | 60/253 |
| 3,367,682 | 2/1968 | Meriano | 285/106 |
| 3,572,726 | 2/1971 | Bottoms | 277/75 X |
| 4,451,017 | 5/1984 | Marshall | 244/172 |

FOREIGN PATENT DOCUMENTS

| | | | |
|---|---|---|---|
| 1177650 | 4/1959 | France | 285/106 |
| 1592109 | 6/1970 | France | 277/206 R |
| 773541 | 4/1957 | United Kingdom | 285/106 |

*Primary Examiner*—Allan N. Shoap
*Attorney, Agent, or Firm*—Howard Paul Terry

[57] ABSTRACT

A space vehicle booster has a lower section and an upper section forming a joint with a seal assembly enclosing a closed cavity. The seal assembly has an upper flange joined to the upper section, and has a lower flange joined to the lower section, and has a collar disposed between the flanges. The flanges are joined by bolts, which slightly compress the collar. The collar has a blind slot, which opens into the closed cavity and which separates an upper collar portion from a lower collar portion. The pressurized gas in the closed cavity urges the upper collar portion against the upper flange and urges the lower collar portion against the lower flange. The collar has an inner pair of "O" rings and an outer pair of "O" rings. Upper and lower chambers are disposed between the "O" rings. A passageway to the chambers has an exterior opening for evacuating the chambers for testing the integrity of the seals prior to launch.

5 Claims, 4 Drawing Sheets

REDUNDANT SEAL FOR PRESSURE VESSELS

BACKGROUND OF THE INVENTION

The present invention relates to a seal and in particular relates to a redundant pressure seal for use between separable sections of a pressure vessel. The redundant pressure seal is usable in a joint between sections of a solid rocket booster which is used with a space shuttle.

The prior art seal of the solid rocket booster includes a cylindrical tang of about 12 feet in diameter on one section, which mates with a cylindrical clevis on the mating section. Two "O" rings are inserted into closely-spaced parallel grooves which are machined into an extension of the inside surface of the clevis. These rings are compressed by the tang section as it is mated with the clevis section. This technique requires maintenance of a stable and uniform gap between the clevis and tang around the complete circumference of the joint in order to maintain proper squeeze on the "O" rings during rapidly changing structural deformations and internal gas pressures.

It should be noted that the entire weight of about 4,500,000 pounds of the space shuttle is borne by the two solid rocket boosters while the space shuttle is at rest on the ground. This results in a huge compressive force on each booster as well as a huge bending moment. The moment occurs because the orbiter is mounted at an offset from the centerline of the external tank. In addition, the combined weight of the orbiter and external tank bears on each booster at a distance from the ground reaction point of the booster. The magnitude of the moment on each booster structure is of the order of 7,000,000 pound-feet while resting on the ground.

The compression of the solid rocket booster structure when combined with the moment due to eccentric loading on the booster when on the ground will result in significant flexing of the booster structure in accordance with principles discussed by S. Timoshenko in his 1936 Engineering Societies Monograph titled "Theory of Elastic Stability". The applicable case is presented in paragraph 4, page 11 of the monograph. This flexing will distort the gap between the tang and clevis and thus adversely impact on the squeeze of the "O" rings, particularly since the structure adjacent to the tang and clevis is the weakest structural element of the booster with regard to resisting bending moments because of looseness resulting from machining tolerances in the shear pins, mating holes, tang and clevis.

The Timoshenko text (page 465) also indicates that thin cylinders tend to become flat when subjected to bending moments. The tang section is more flexible than the clevis section and therefore is more susceptible to becoming oval, introducing a further source of distortion in the "O" ring gap. It is also known that the ends of the sections tend to become oval due to handling during transportation prior to assembly and stacking.

When the boosters are fired for lift-off, there is a large and sudden build up of pressure within the booster which causes the shell to bulge outward. Here, again, the "O" ring gaps are susceptible to changes because the clevis section is stiffer than the tang section which will bend away from the clevis extension. When the space shuttle is released from the ground, the compressive force in the booster is suddenly changed to a tensile force which causes angular oscillations in the booster structure. This arises because the booster has a high elastic energy stored in its structure when resting on the ground because of the flexure due to the combined compression and moment. This energy is suddenly released at lift-off and causes the booster structures to act like giant vibrating strings. Here, again, the "O" ring gaps are very susceptible to distortion because of looseness at the joints.

SUMMARY OF THE INVENTION

The seal assembly according to the present invention comprises a flat circular colar which is sandwiched between flanges at the joints between the pressure vessel attachable sections. The circular collar contains four "O" rings within grooves machined in the collar. There are two "O" rings on each side of the collar. The inside pair of "O" rings is designated the primary seal; the outer pair of "O" rings serve as the backup seal.

By using such structure of the present invention the problems of the prior art seal assembly are avoided.

DESCRIPTION OF THE PREFERRED EMBODIMENTS

Figure 1:
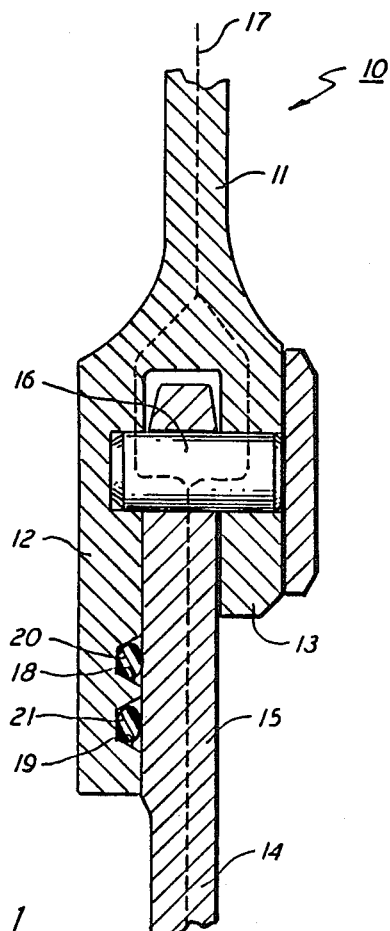
FIG. 1 is a section view of a prior art seal assembly.

In FIG. 1, the prior art seal assembly 10 is shown. It is described hereafter in further detail. It is helpful to analyze the deficiencies of the prior art seal of a solid rocket booster as shown in FIG. 1. The cross-section in FIG. 1 is applicable around the complete circumference of the diameter of the joint.

In FIG. 1, prior art seal assembly 10 includes upper booster section 11, which in this embodiment is approximately 12 feet in diameter. The upper booster section 11 has a cylindrical clevis at its end. The clevis has two uneven legs 12 and 13. The longer leg 12 faces the internal part of the booster; the shorter leg 13 faces the external environment. The lower booster section 14 has a cylindrical tang 15. The cylindrical clevis of section 11 and the cylindrical tang 15 are machined with tolerances to maintain a uniform clearance around the complete circumference of the mating ends. This clearance is required to enable the sections to mate and be separated readily since they are reusable after each firing. The forces that exist in the booster sections or shells 11 and 14 are transmitted through shear pins 16 which are inserted into mating holes in the clevis legs 12, 13 and the tang 15. The inside part of the clevis leg 12 contains a blind hole. A dotted line 17 in FIG. 1 represents a transmission path of compressive forces. It should be noted that the shear pins 16 must also be mated and separated readily for ease of assembly before firing and disassambly of the sections after each firing. This requires adequate clearance tolerances between the shear pins 16 and their mating holes. The tolerances between the tang 15 and clevis legs 12, 13 and between the shear pins 16 and their mating holes account for the relative looseness of seal assembly 10, which can amplify gap anomolies due to structural flexure, cylinder ovalization and dynamic oscillations that were previously described.

Grooves 18 and 19 are machined into the inside surface of clevis leg 12 to contain respective "O" rings 20 and 21 which are required to be squeezed to an extent which will seal the gap between the gang 15 and the longer clevis leg 12. In this embodiment, the recommended squeeze tolerance for 0.275 inch diameter "O" rings is between 0.040 to 0.055 inch. This represents an overall gap tolerance under static, dynamic and oscillatory conditions of only 0.015 inch over a circumferential groove length of 452 inches. This requires very exacting machining, inspection and handling procedures prior to stacking of the sections. A virtually impossible situation is indicated when the 0.015 inch gap tolerance must be maintained after assembly and firing.

Another factor that should be considered relates to the ovalization that takes place when the structure is subjected to bending moments. The degree of ovalization is a function of the thickness of the shell. The section thickness at a section through shell 14 in FIG. 1 is much less than the shell thickness at a section through legs 12, 13. It is estimated that the bending stiffness at the section through legs 12, 13 is three times that of the section through shell 14. This means that the end of tang 15 will become significantly more oval than the end of clevis legs 12, 13. Furthermore, the lower clevis leg 12 which houses the "O" rings 20, 21 is not subjected to the forces and moments of the structure while the tang section 14 is subjected to the full forces and moments as indicated by the dotted force path 17. This can account for a very significant variation in gap around the circumference of the "O" ring 19 or 20.

Figure 2:
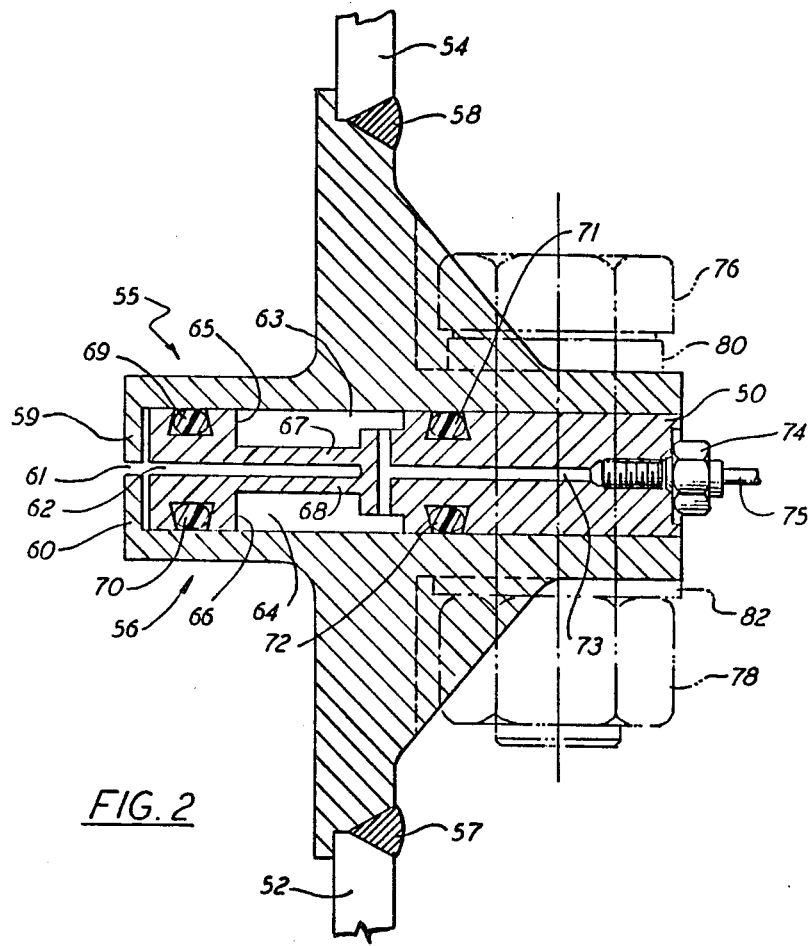
FIG. 2 is a section view of a seal assembly according to the present invention as taken along line 2—2 of FIG. 4.
Figure 4:
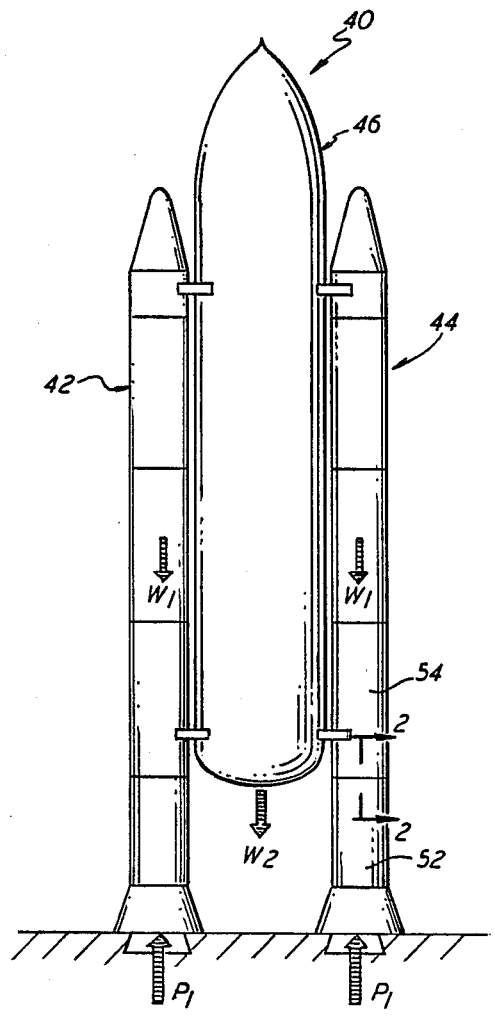
FIG. 4 is an elevation view prior to launch of a space vehicle incorporating the present invention.

In FIG. 4, a space vehicle 40, which has seal assemblies according to the invention, is shown. Vehicle 40 has a first booster 42, a second booster 44, and the ramainder of a space shuttle 46 which comprises an expendable external tank and the orbiter. Boosters 42 and 44 have seal assemblies as shown in FIG. 2. For example, booster 44 has lower section or shell 52, upper section or shell 54, and the seal assembly comprising a pair of flanges 55 and 56 between which is sandwiched a collar 50. The flanges 55 and 56 are welded to booster shells 52 and 54 by welds 57 and 58. Booster 44 is identical to booster 42. FIG. 2 is applicable around the complete circumference of the diameter of the booster shells 52 and 54. The boosters 42 and 44 are subject to various forces as explained hereinafter.

In FIG. 2, seal member 50 is a one-inch thick by 4¼ inch wide collar. Collar 50 is sandwiched between flanges 55 and 56 by means of bolts 76, nuts 78, lockwashers 80 and washers 82. In this embodiment, a total of 125 bolts is evenly spaced around the circumference of flanges 55, 56. In this embodiment, such bolts, nuts and washers are 1 inch diameter heavy hexagonal structural type per American Standard B18.2.1 - 1965 as tabulated on pages 17, 18, 19 and 240 of the 1965 Fastener Standards, published by the Industrial Fasteners Institute. The bolts are ASTM A 490 rated at a proof load of 72,700 pounds without deformation; the nuts are ASTM A 194 rated at a proof load of 87,250 pounds with no evidence of stripping. The purpose of lockwashers 80 is to ensure that flanges 55, 56 have sufficient force applied to the body of collar 50 when the bolts are subjected to the extreme tensile stretch during firing of the solid rocket booster.

Flanges 55, 56 have extensions 59, 60 to act as a backing for the internal shell insulation in the vicinity of collar 50. Extensions 59, 60 provide an opening 61 enabling propellent gas to enter a radial slot 62 into the collar 50.

Blind slot 62 is machined around the inside circumference of collar 50 to a depth of about 1¾ inches. Slot 62 allows internal booster pressure to act on the upper and lower surface thereof. Annular chambers 63, 64 are created by machining grooves 65, 66 in collar 50 to a depth which will result in flexible membranes 67, 68 between slot 62 and chambers 63, 64. Membranes 67, 68 allow the top and bottom portions of the inside portion of collar 50 to contour itself to any waviness or distortions on the inside portions of flanges 55, 56 when slot 62 is pressurized relative to the chambers 63, 64. The inside thickness of collar 50 is machined slightly greater than the outside thickness, thus ensuring positive contact through the flexibility of the membranes 67, 68 when the bolts 76 are tightened.

Dove tail grooves are machined on the collar to house and retain four 0.275 inch "O" rings 69, 70, 71, 72. The dove tail grooves are dimensioned in accordance with the recommendations of Parker Seal Company (page 5-2 of their catalog OR5700, dated August, 1971). The inside set of "O" rings 69, 70 form the primary seals. The outside set of "O" rings 71, 72 form the back-up seals. The tensions in the bolts 76 are used to compress the back-up "O" rings 71, 72 into the dove tail grooves in the collar 50.

Initially, the inside, primary seals 69, 70 are individually compressed by the flexible membranes 67, 68. The compression forces are increased tremendously as the internal booster pressure builds up after ignition and enters slot 62.

A single passageway 73 between two bolts 76 of the 125 bolts is provided to interconnect the chambers 63, 64. Passageway 73 has an "O" ring gasketed fitting 74 to which is brazed a ⅛ diameter oxygen-free soft copper tube 75. The copper tube material is of a type suitable for vacuum-type pinch-off. The fitting 74 and the mating hole in the collar are dimensioned in accordance with the requirements of Military Standards MS33656 and MS33649. The purpose of the tube 75 and its connection to the chamber 63, 64 is to provide a means to evacuate chambers 63, 64 and monitor the vacuum to establish if it is maintained when a vacuum pump is disconnected. The vacuum should be maintained indefinitely if the primary seals 69, 70 and back-up seals 71, 72 have been installed properly. When the integrity of the seals 69, 70, 71, 72 has been verified, copper tube 75 is pinched off using well-known techniques for maintaining vacuum after evacuation. The seals 69, 70, 71, 72 are thus tested without requiring pressurization of the internal volume of booster 44. It should be noted that the use of the vacuum technique subjects the primary seals 69, 70 to a pressure difference in a direction that is the same when the booster is fired. This should be contrasted with the prior art pressurization test used which subjects the primary seal to a pressure difference which is opposite to that which it is subjected when ignition occurs.

There are certain advantages to the features of the invention as indicated hereafter.

a. The back-up "O" rings 71, 72 are held in intimate contact with the flanges 55, 56 by bolts 76 which hold the flanges 55, 56 together. The "O" rings 71, 72 are in close proximity to where bolts 76 are located.

b. The construction of flanges 55, 56 provides a very stiff constraint to bending moments that operate on the joints of booster 44 and thus eliminates the possibility of booster structure distortion from affecting the squeeze on "O" rings 69, 70, 71, 72. The stiffness due to flanges 55, 56 also eliminates any distortions due to handling and transportation prior to assembly and stacking.

c. The blind radial slot 62 is machined in the middle of the inside surface of collar 50 which contains the "O" rings grooves. The inside set of "O" rings 69, 70 are located above and below radial slot 62 which is exposed to the internal pressure of booster 44. The higher the pressure, the more force is exerted on the "O" rings 69, 70, assuring that a proper squeeze is maintained even though there might be flange surface waviness or distortion at the inside portion of the flange 55 or 56.

d. The combination of four "O" rings 69, 70, 71, 72 is truly redundant since the inside pair of "O" rings 69, 70 operates on an entirely different principle than the outside pair of "O" rings 71, 72.

e. The sandwich construction of the seal assembly eliminates any requirement to machine precision grooves on the 12 foot diameter by 40 foot high solid rocket booster sections, as is required in the prior art sections 11, 14.

f. A passageway 73 is provided to the chambers 63, 64 between the "O" rings 69, 70, 71 and 72 enabling the integrity of the seals of the "O" rings to be verified before being used, by subjecting the chamber 63, 64 to a vacuum and observing that the vacuum is maintained.

g. Stacking of the sections 52, 54 of booster 44 according to the invention during final assembly is considerably less complex than the stacking of the prior art sections 11, 14 having tang and clevis parts 12, 13, 15.

Figure 3:
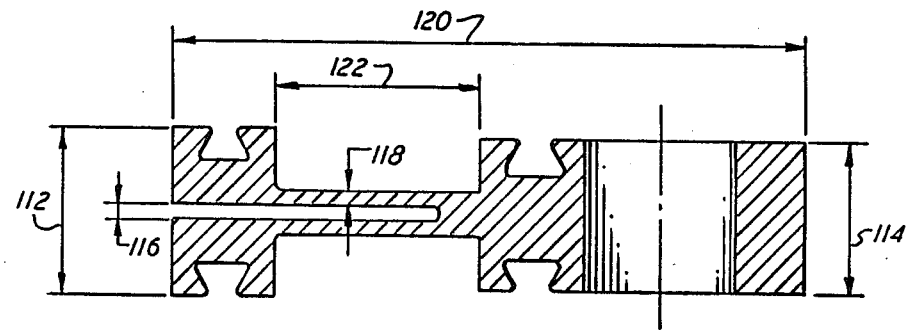
FIG. 3 is a cross-sectional view of the collar of the seal.

In FIG. 3, collar 50 is shown in an enlarged view. Collar 50 has an inside thickness 112, an outside thickness 114, a slot opening 116, and a membrane thickness 118. Collar 50 also has a width 120 and a chamber width 122. In this embodiment, inside thickness 112 is 1.00 inch, outside thickness 114 is 1.03 inch, slot opening 116 is 0.15 inch, and membrane thickness 118 is 0.08 inch. Length 120 is 4.30 inch, and chamber width 122 is 1.40 inch. The width 120 is about four times the inside thickness 112. The inside thickness 112 is slightly larger than the outside thickness 114. Chamber width 122 is about one-third the length 120.

In FIG. 4, space vehicle 40 is shown. The forces acting on vehicle 40 prior to launch are also shown. Booster 42 has a downward force W1, and booster 44 has an identical downward force W1, and the remainder of the space shuttle 46 has a downward force W2. Booster 42 has a ground reaction force P1, and booster 44 has an equal reaction force P1.

Figure 5:
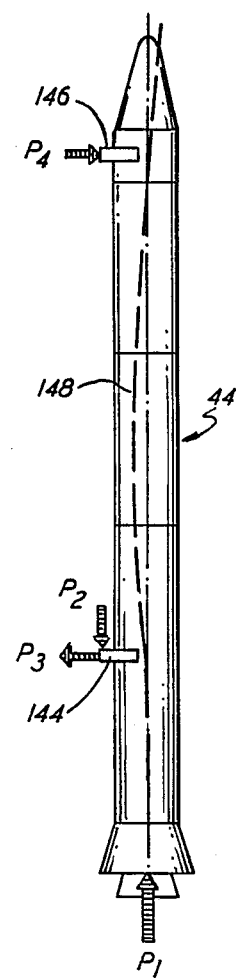
FIG. 5 is an elevation view of a portion of FIG. 4.

In FIG. 5, booster 44 is shown. The forces acting on booster 44, and the deflection of its centerline or axis 148, prior to launch are shown. Booster 44 has an aft attachment 144 and a forward attachment 146. A force P1 acting on booster 44 causes a vertical reaction P2 and a horizontal reqction P3 at attachment 144, and causes a horizontal reaction P4 at attachment 146.

Figure 6:
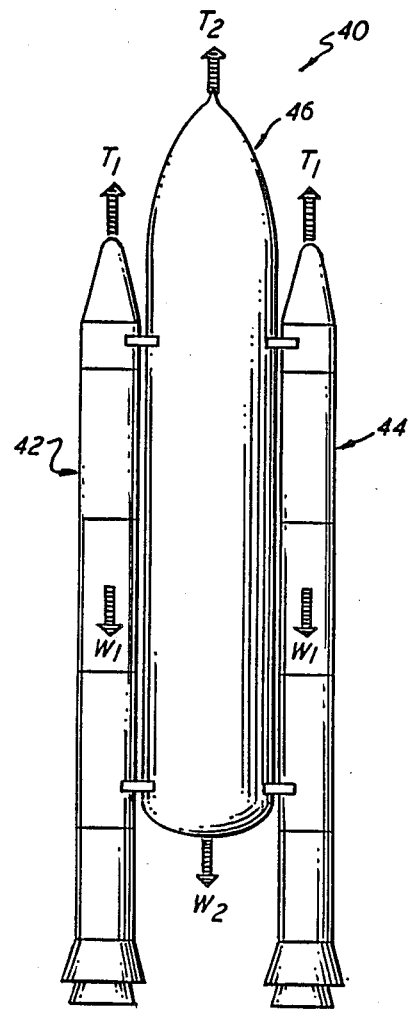
FIG. 6 is an elevation view after launch of the space vehicle of FIG. 4.

In FIG. 6, space vehicle 40 is shown after launch. Booster 42 has the force W1, and booster 44 has the identical force W1, and space shuttle has the force W2. Booster 42 has a thrust force T1, and booster 44 has an identical thrust force T1, and space shuttle has a thrust force T2.

Figure 7:
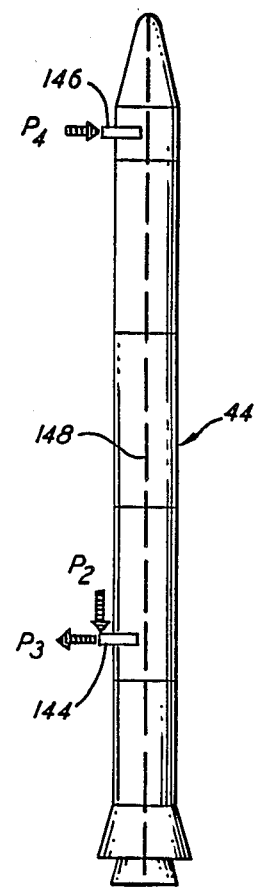
FIG. 7 is an elevation view of a portion of FIG. 6.

In FIG. 7, booster 44 is shown. The forces acting on booster 44, and the shape of its centerline 148, after launch are shown. The amount of each of the forces P2, P3 at attachment 144, and force P4 at attachment 146 increase because thrust T1 is greater than force P1 after launch.

In FIG. 5, the centerline or axis 148 is flexed, due to compressive force and bending moment at attachments 144, 146. In FIG. 7, after launch, centerline 148 is not flexed due to the tension resulting from thrust T1.

The forces on booster 44, as shown in FIG. 4, 5, 6, 7 cause one set of forces and moments on the seals between the booster sections before launch and cause another set of forces on the seals after launch.

The structural features of the seal assembly comprising collar 50, flanges 55, 56, bolts 76, extensions 59, 60, slot 62, chambers 63, 64, membranes 67, 68, "O" rings 69, 70, 71, 72, passageway 73 and fitting 74 are better able to resist such forces and moments than the prior art seal assembly 10, as explained heretofore in the listing of the advantages of the features of the seal assembly of this invention.

While the invention has been described in its preferred embodiments, it is to be understood that the words which have been used are words of description rather than limitation and that changes may be made within the purview of the appended claims without departing from the true scope and spirit of the invention in its broader aspects.

The embodiments of an invention in which an exclusive property or right is claimed are defined as follows:

1. A seal assembly for joining an upper section with an axis to a lower section disposed coaxially therewith and forming a closed cavity comprising:

an upper flange joined to the upper section;
a lower flange joined to the lower section;
a collar disposed between the upper flange and the lower flange; and
a plurality of peripherally spaced connectors connecting the upper flange to the lower flange and compressing the collar;
said collar including:
a blind slot with an opening facing the closed cavity forming an upper collar portion and a lower collar portion;
said upper collar portion having an upper groove forming an upper chamber with the upper flange;
said lower collar portion having a lower groove forming a lower chamber with the lower flange;
an upper membrane formed between said upper chamber and said slot by said upper collar portion;
a lower membrane formed between said lower chamber and said slot by said lower collar portion;
whereby pressurized gas in the closed cavity and in the slot urges the upper collar portion against the upper flange and the lower collar portion against the lower flange; wherein
said upper collar portion has an upper inner "O" ring engaging the upper flange;
said lower collar portion has a lower inner "O" ring engaging the lower flange; and
said inner "O" rings are disposed radially inwardly of said chambers and said membranes,
for sealing the closed cavity; and wherein
said collar has an upper outer "O" ring engaging the upper flange;
said collar has a lower outer "O" ring engaging the lower flange; and said outer "O" rings has disposed radially outwardly of said chambers and said membranes,
for sealing the chambers; and wherein
said collar has a passageway with an opening facing radially outwardly;
said pasasgeway connecting to the upper chamber and the lower chamber,
for evacuating the chambers.

2. The seal assembly of claim 1, wherein
said passageway opening has a fitting with a closable portion,
for sealing the opening after evacuating the chambers.

3. The seal assembly of claim 1, wherein
said upper flange has an upper extension covering the upper collar portion; and
said lower flange has a lower extension covering the lower collar portion,
whereby the radially inner ends of the upper collar portion and lower collar portion are protected.

4. The seal assembly of claim 1, wherein
said connectors are a plurality of peripherally spaced bolts.

5. The seal assembly of claim 1, wherein
said collar in section has a width and a thickness, the width to thickness ratio is equal to about 4.0, and
said collar chamber in section has a width, the collar width to chamber width ratio is equal to about 3.0.

* * * * *